United States Patent Office 2,762,788
Patented Sept. 11, 1956

2,762,788

DISSOLUTION AND PURIFICATION OF POLYETHYLENE TEREPHTHALATE

Erhard Siggel, Kleinwallstadt, and Johannes Kleine, Munich, Germany

No Drawing. Application June 16, 1952, Serial No. 293,850

Claims priority, application Germany June 21, 1951

1 Claim. (Cl. 260—75)

This invention relates to methods of dissolution and purification, and more particularly to a method of dissolving and purifying polyethylene terephthalate.

It is known to dissolve polyesters of aliphatic dicarboxylic acids and diols, in benzene, carbon tetrachloride or chloroform. On the other hand, the dissolution of polyethylene terephthalate has met with great difficulties as hardly any solvents were known which dissolve this aromatic polyester. Cresol, phenol, nitrobenzene or lactones were proposed as solvents; these compounds, however, have the most serious drawback that the resulting solutions are subject to strong discoloration, particularly on heating over an extended period. Accordingly, it was not possible to make solutions of polyethylene terephthalate and the like which would remain colorless.

We have discovered that stable colorless solutions of polyethylene terephthalate can be obtained by using as the solvent a liquid or meltable organic compound having two cyclic nuclei which are joined either directly or by O—, CO—or (CH$_2$)$_n$—groups where $n$ is an integer from 1 to 4. Also, these organic compounds may contain in the nucleus one or more substituents, such as CH$_3$—, CH$_3$O—, C$_2$H$_5$, C$_2$H$_5$O—, C$_3$H$_7$—, or C$_3$H$_7$O—. Examples of such compounds are diphenyl, diphenyl ether, naphthalene, methyl naphthalene, benzophenone, diphenyl methane or similar compounds. Solvents or mixtures thereof, of this type, at temperatures from about 160° to about 240° C., dissolve a polyester such as polyethylene terephthalate completely. When these solutions are cooled to about 100° C. the polycondensate precipitates in an amorphous, gel-like state, and can be obtained in solid form after washing with a suitable low boiling organic compound such as acetone, chloroform or the like. The low molecular fractions of the polycondensate, however, remain dissolved in the solvent and thus are removed from the polycondensate in a simple manner. Obviously the procedure has the advantage of resulting in a homogeneous polycondensate which is free from low molecular fractions.

The invention will be more fully described by reference to the following specific examples. It should be understood, however, that the examples are given by way of illustration only and that the invention is not to be limited by the details set forth therein.

*Example I*

25 grams of crude polyethylene terephthalate (shredded) are introduced into 100 cc. of diphenyl ether, and the mixture is heated to 180°–240° C., complete dissolution taking place after about 20 minutes. On slow cooling to room temperature the polyethylene terephthalate precipitates in gel-like form whereupon it is treated with benzene or acetone. The polyethylene terephthalate is obtained in form of a solid powder. The polyethylene terephthalate thus recovered has a melting point by 2° C. higher than that of the starting product, indicating that the low molecular fractions have remained in solution.

*Example II*

25 grams of crude polyethylene terephthalate are introduced into 150 cc. α-methyl naphthalene, and the mixture is heated to 160°–240° C., complete dissolution taking place within 15 minutes. After a treatment corresponding to that described with reference to Example I, the polyethylene terephthalate is obtained in the form of a solid powder. Its melting point is at 247.5° C.

*Example III*

25 grams of crude polyethylene terephthalate are dissolved in 150 grams of tetrahydronaphthalene at 170°–180° C. in a manner corresponding to that described with reference to Example I. The polyethylene terephthalate dissolves completely within about 20 minutes and is then further treated as described for Example I. The polyethylene terephthalate is obtained as a powder of excellent purity and having a melting point of 247.5° C.

*Example IV*

25 grams of crude polyethylene terephthalate are dissolved in 120 cc. of diphenyl methane. Complete dissolution occurs at about 200° C. After a treatment such as described for Example I polyethylene terephthalate in the pure state is obtained; it has its melting point at 248° C.

*Example V*

25 grams of crude polyethylene terephthalate are dissolved in 120 grams of benzophenone at about 220° C. and further treated as described above with reference to Example I. The melting point of the polyethylene terephthalate thus obtained, is at 247.5° C.

*Example VI*

25 grams of crude polyethylene isophthalate are dissolved in 120 cc. of α-methyl naphthalene at about 180° C. and further treated as described above with reference to Example I. On completion of this treatment the polyester having a melting point of 166°–170° C. is obtained.

While we have disclosed the preferred embodiments of our invention and the preferred modes of carrying it into effect, it will be readily apparent to those skilled in the art that the invention as illustrated in the foregoing specification, is susceptible to numerous variations without departure from the spirit of the invention or sacrifice of the advantages thereof. Accordingly, the scope of the invention is to be understood as limited solely by the appended claim.

We claim:

The method of purifying polyethylene terephthalate which comprises dissolving the polyester in a compound selected from the group consisting of diphenyl, diphenyl ether, naphthalene, methylnaphthalene, benzophenone, and diphenylmethane, at a temperature ranging from 160 to 240° C., cooling the solution slowly for the precipitation of the pure solid polycondensate and washing with a low boiling organic liquid for the removal of the low boiling fractions of the polycondensate.

References Cited in the file of this patent

UNITED STATES PATENTS

| | | |
|---|---|---|
| 2,061,635 | Sandig | Nov. 24, 1936 |
| 2,491,350 | Young | Dec. 13, 1949 |

FOREIGN PATENTS

| | | |
|---|---|---|
| 609,947 | Great Britain | Oct. 8, 1948 |

OTHER REFERENCES

Paint Manufacture, article by Wright et al., pages 76–80, vol. XV3.